3,034,791
POLYURETHANE GOLF BALL COVERS

Richard J. Gallagher, Glenview, Ill., assignor to E. I. du Pont de Nemours and Company, Wilmington, Del., a corporation of Delaware
No Drawing. Filed Apr. 26, 1960, Ser. No. 24,682
2 Claims. (Cl. 273—235)

This invention relates to a novel golf ball cover and more particularly to a golf ball cover prepared from a polyurethane composition.

It is an object of the present invention to provide a novel polyurethane composition. It is a further object to provide a golf ball cover made from this polyurethane composition, which golf ball cover displays superior cut and abrasion resistance. A still further object is to provide a novel golf ball having a conventional core and a cover made from a novel polyurethane composition. Other objects will appear hereinafter.

These and other objects of this invention are accomplished by a novel polyurethane composition which is obtained from (a) 100 parts by weight of the reaction product of about 1.0 mole of a polytetramethyleneether glycol having a number average molecular weight of about 1000 and about 2.0 moles of an organic diisocyanate selected from the group consisting of toluene-2,4-diisocyanate and an isomeric mixture of toluene-2,4-diisocyanate with up to about 25 percent by weight of toluene-2,6-diisocyanate; (b) about 9 to 11 parts by weight of titanium dioxide; and (c) about 16 parts by weight of 4,4'-methylene-bis(2-chloroaniline). This polyurethane composition is highly useful for molding a golf ball cover. Accordingly, the present invention contemplates a novel golf ball having a cover prepared from this polyurethane composition around a conventional core.

The novel polyurethane composition of the present invention is prepared by mixing an organic diisocyanate-polytetramethyleneether glycol reaction product with titanium dioxide and a diamine curing agent in specific proportions. After the polyurethane composition has been prepared it increases in viscosity due to the reaction of the diamine with the organic diisocyanate-polytetramethyleneether glycol reaction product and eventually becomes a tough elastomer. While in the plastic state, it may be shaped into a golf ball cover around a conventional core. It has been determined that the resulting golf ball is much more abrasion- and cut-resistant than a conventional golf ball.

The organic diisocyanate-polytetramethyleneether glycol reaction product is prepared by reacting, under substantially anhydrous conditions, about two moles of toluene-2,4-diisocyanate with about one mole of polytetramethyleneether glycol having a number average molecular weight of about 1000. Pure toluene-2,4-diisocyanate is preferred; however, one can use isomer mixtures containing up to 25 percent toluene-2,6-diisocyanate, the remainder being toluene-2,4-diisocyanate. Alternatively, the said isomers can be separately reacted with the polytetramethyleneether glycol and the products obtained blended to give the desired composition. Agitation is normally used to provide thorough mixing of the reactants and to aid in the temperature control. The reaction is carried out at a temperature between about 25° C. and 100° C. for a period of from ½ to several hours. In general, it is preferred to carry out the reaction at 80° C. for about 4 hours. It is to be understood that the lower temperatures require longer reaction times and at temperatures above about 100° C. a composition of increased viscosity is obtained. In the absence of moisture, the organic diisocyanate-polytetramethyleneether glycol reaction product is fluid and is stable for indefinte periods at room temperature. By fluid is meant pourable at 100° C.

About 9 to 11 parts of titanium dioxide is then introduced into 100 parts, by weight, of the organic diisocyanate-polytetramethyleneether glycol reaction product at about 25° C. by several passes through a 3-roll paint mill. The ultimate cured golf ball cover has too low a modulus at 100 percent extension when less titanium dioxide is present whereas its tensile strength decreases when higher proportions of the pigment are employed. The titanium dioxide is dried at 140° C. for about 3 hours before it is dispersed into the organic diisocyanate-polytetramethyleneether glycol reaction product.

The pigmented organic diisocyanate-polytetramethyleneether glycol reaction product is then heated to about 100° C. and degassed under high vacuum (e.g. 5 or less mm. Hg) for about 10–20 minutes. The temperature is then adjusted to about 95° C. and about 16 parts by weight 4,4'-methylenebis(2-chloroaniline) is added. It is preferable for best dispersions that the amine be molten; however, it can be introduced as a powder. Optimum vulcanizate modulus, hardness, and tear strength are obtained when about 16 parts of the amine is supplied for every 100 parts by weight of the organic diisocyanate-polytetramethyleneether glycol reaction product present in the pigmented mixture. It has been determined that when higher (or lower) proportions of the amine are introduced, the cut resistance of the cured golf ball cover decreases. After the mixture has been stirred for about a minute it is ready for pouring.

The reaction of the organic diisocyanate-polytetramethyleneether glycol reaction product with the diamine converts the former to a cured polyurethane elastomer. In reaching this state it passes through a plastic gum stage during which it can be shaped into a golf ball cover. Gum formation requires about 2–3 hours at about 25–30° C. Thereafter, one generally waits at least 2 to 3 hours, preferably 5 to 9 hours, before molding. The longest plastic gum aging time is used consistent with good molding results. The viscosity of the gum is directly proportional to the aging time. Thus, when short aging times are used, the stock has a low viscosity. Such a golf ball cover stock often leads to poor golf core centering and thread show-through. Inordinately long aging times should also be avoided because the resulting high gum viscosity limits penetration of the stock into the thread interstices causing poor cover adhesion; uneven compression, back-rinding, and poor knitting are other consequences.

There are several ways in which the golf ball cover can be formed. In general, any golf ball center which has been used heretofore can be used for preparing the novel golf balls of the present invention. Golf ball cores suitable for use in the present invention are described in the following patents: United States Patents 1,530,820; 1,677,360; 1,947,539; 2,201,691; 2,249,612; 2,324,768; 2,342,603; 2,363,059; 2,363,086; 2,609,201; British patents 341,163; 361,628; 387,084; 483,977; German Patent 599,403; Canadian Patents 383,408 and 416,299. Core windings suitable for use in the present invention are described in the following patents: United States Patents 2,095,119; 2,278,381 and 2,519,231.

In one method for preparing the golf ball cover, the newly mixed composition is poured onto a sheet of "Mylar" polyester film to form a layer about 100 to 125 mils thick. After the gum has formed, a cover of "Mylar" polyester film is added and the composite article is pressed or milled to give a gum layer 100 mils thick. After the sheets have been cooled with crushed solid carbon dioxide, the "Mylar" polyester film is stripped off. The gum is cut into disks 2¼ to 2½ inches in diameter which are ready for molding after standing at least 2 to 3 hours longer. A standard rubber golf ball center having the usual external winding of rubber thread is placed between 2 disks in a golf ball mold which is then closed and heated. The plastic gum flows into the interstices of the rubber thread and forms a spherical cover.

In a second method, disks 1¼ to 1½ inches in diameter are cut from polyethylene sheets about 100 to 120 mils thick. One side of these holes is covered by a sheet of "Mylar" polyester film. The resulting cavities are then filled with the polyurethane composition which is allowed to stand until ready for the golf ball mold. Scrap losses are avoided.

In a third method, a sheet of polyethylene is used having a plurality of hemispherical indentations 1¼ to 1½ inches in diameter. After these hemispheres have been loaded with the polyurethane cover composition, a sheet having hemispherical projections is placed above this form. The projections are thereby inserted into the indentations. The space between the hemispheres, occupied by the cover composition, defines a hemispherical shell having a thickness of about 100 mils. After the plastic gum has been formed, the upper sheet is removed. Golf ball centers having rubber threads are placed in all the hemispherical shells of one sheet. The empty hemispherical shells of another sheet are placed over the exposed halves of the golf ball centers. Each pair of hemispheres then fuses to form a single sphere which encapsulates a golf ball center. Alternatively, the shells can be stripped from the sheets and placed in golf ball molds (along with the threaded centers).

In general, any material may be used for molding the golf ball cover which is dimensionally stable under the operating conditions. It is convenient to employ substrates to which the plastic gum cannot adhere, such as polyethylene. However, metals (e.g. aluminum and steel), hard wood (e.g. ebony), and plastics (e.g. epoxy resins, reinforced fiber glass) to which it sticks can be used when coated with conventional mold release agents such as high-melting wax or a suitable silicone resin.

The best curing conditions compatible with the thermal stability of each type of golf ball center employed can readily be determined by one skilled in the art. For maximum cover toughness it is desirable to use the longest curing time at the highest temperature permitted by the heat resistance of the center and production costs. In general, longer curing times are required at lower temperatures and vice versa. Good results have been obtained with curing times ranging from 5 minutes at 110° C. to 30 minutes at 70° C. A convenient procedure is 20 minutes at 80° C. An after cure of 24 hours at 60° C. has been found to improve cover toughness of stock cured 20 minutes at 85° C. or 10 minutes at 90° C. without causing distortion of the ball.

The following examples will better illustrate the nature of the present invention; however, the invention is not intended to be limited to these examples. Parts are by weight unless otherwise indicated.

EXAMPLE 1

A. *Preparation of Fluid Polyisocyanate Composition A*

348.4 parts of toluene-2,4-diisocyanate and 1000 parts of anhydrous polytetramethyleneether glycol having a number-average molecular weight of 1000 are agitated at 80° C. for 4 hours in a dry reaction vessel protected from atmospheric moisture. Polyisocyanate Composition A thus obtained has a free isocyanate content of 6.4 percent and a Brookfield viscosity at 30° C. of 6,000 to 7,000 c.p.s.

B. *Preparation of Plastic Cover Composition*

Titanium dioxide is oven dried at 140° C. for 3 hours. Ten parts by weight is then dispersed at 25° C. in 100 parts of Polyisocyanate Composition A in a 3-roll mill. The mixture obtained is heated to 100° C. and degassed for 10 minutes under 5 mm. Hg vacuum. The temperature is adjusted to 95° C. and 16 parts of 4,4'-methylenebis(2-chloroaniline) is added with stirring. After one-minute's agitation the mass is spread onto a sheet of "Mylar" polyester film to a thickness of about 100–125 mils, allowed to cool and form a plastic gum. Three hours later a second sheet of "Mylar" polyester film is applied to cover the gel which is then pressed to a thickness of about 70 mils. After 9 more hours the sheets are cooled with crushed solid carbon dioxide and the sheets of "Mylar" polyester film are stripped off to be replaced by waxed paper. Disks of the plastic cover composition having a diameter of 2¼ inches are cut.

C. *Molding the Covered Golf Ball*

A cover composition plastic disk made according to the procedure of Part B above is placed in each half of each cavity of a conventional golf ball mold which has previously been coated with a high melting wax (mold release agent) and heated to 80° C. A conventional rubber thread wound balata golf ball core is then positioned in the bottom half of the mold so that the final rubber thread winding is at right angles to the plane formed by the seam; the loose thread end is up. The top of the mold is lowered into place. Pressure is increased gradually for about 30 seconds; the press is closed and the pressure is adjusted to 1200 lbs./sq. in. The golf ball cover is molded at 80° C. for 15 minutes. The mold is then removed from the press and cooled to 25° C. in cold water in 10 minutes. The golf ball is removed and given an after-cure at 70° C. for 24 hours. The cover has excellent cut resistance.

D. *Demonstration of the Criticality of Proportions*

The procedure of Parts A–C above is repeated except that 20 parts of 4,4'-methylenebis(2-chloroaniline) is used instead of 16 parts. The cover of the golf ball obtained displays much less cut resistance than the one obtained in Part C above.

EXAMPLE 2

The cover composition is prepared by the procedure of Parts A and B above. Three hours after the composition has been poured onto a sheet of "Mylar" polyester film, the compound is sheeted out to 75 mil thickness and 2¼ inch diameter plastic disks are died out. The disks are aged an additional period of 4 hours at room temperature. A pre-cut disk is placed in each half of each cavity of a conventional golf ball mold which has been coated with a high-melting wax and heated to 80° C. A conventional rubber thread wound balata golf ball center is positioned in the mold by the procedure of Part C of Example 1. After the top of the mold has been lowered into place, the mold is closed slowly in a press and the pressure is raised to 1200 lb./sq. in. The golf ball is cured at this pressure at 80° C. for 20 minutes. The mold is cooled to room temperature under pressure. The golf ball is removed and after-cured at 70° C. for 2 hours. Its cover displays excellent cut and abrasion resistance.

As many widely different embodiments of this invention may be made without departing from the spirit and scope thereof, it is to be understood that this invention is not limited to the specific embodiments thereof except as defined in the appended claims.

What is claimed is:

1. A novel golf ball comprising a core and a cover around said core, said cover being a polyurethane composition which is obtained from (a) about 100 parts by weight of the reaction product of about one mole of a polytetramethyleneether glycol having a number-average molecular weight of about 1000 with about two moles of an organic diisocyanate selected from the group consisting of toluene-2,4-diisocyanate and an isomeric mixture of toluene-2,4-diisocyanate with up to about 25 percent by weight of toluene-2,6-diisocyanate, (b) about 9 to 11 parts by weight of titanium dioxide, and (c) about 16 parts by weight of 4,4'-methylenebis(2-chloroaniline).

2. A polyurethane composition suitable for molding golf ball covers obtained from (a) about 100 parts by weight of the reaction product of about one mole of a polytetramethyleneether glycol having a number-average molecular weight of about 1000 with about two moles of an organic diisocyanate selected from the group consisting of toluene-2,4-diisocyanate and an isomeric mixture of toluene-2,4-diisocyanate with up to about 25 percent by weight of toluene-2,6-diisocyanate, (b) about 9 to 11 parts by weight of titanium dioxide, and (c) about 16 parts by weight of 4,4'-methylenebis(2-chloroaniline).

References Cited in the file of this patent

UNITED STATES PATENTS

| | | |
|---|---|---|
| 2,272,036 | Dickson | Feb. 3, 1942 |
| 2,318,547 | Welch | May 4, 1943 |
| 2,729,618 | Muller et al. | Jan. 3, 1956 |
| 2,805,072 | Smith | Sept. 3, 1957 |
| 2,806,824 | Semegen | Sept. 17, 1957 |
| 2,818,404 | Hill | Dec. 31, 1957 |
| 2,912,414 | Schultheis | Nov. 10, 1959 |
| 2,917,489 | Gladding et al. | Dec. 15, 1959 |
| 2,939,710 | Dosmann et al. | June 7, 1960 |